United States Patent Office 3,524,003
Patented Aug. 11, 1970

3,524,003
METHOD OF RENDERING A SURFACE REPELLENT TO BIRDS WITH 2,6-DI-CYCLOHEXYL-4-METHYLPHENOL
Andrew J. Reinert, Bartlesville, Kenneth E. Cantrel, Dewey, and Raymond L. Cobb, Bartlesville, Okla., assignors to Phillips Petroleum Company, a corporation of Delaware
No Drawing. Filed July 21, 1966, Ser. No. 566,721
Int. Cl. A01n 9/26
U.S. Cl. 424—346          5 Claims

ABSTRACT OF THE DISCLOSURE

Birds are repelled by applying to a surface a compound of the formula

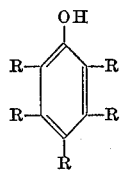

wherein each R can be the same or different and is hydrogen, alkyl, aryl, alkaryl, aralkyl, alkylcycloalkyl or cycloalkylalkyl.

---

This invention relates to bird repellents. In one aspect, this invention relates to methods of rendering a surface repellent to birds. In another aspect, this invention relates to bird repellent compounds and compositions.

The problems associated with birds resting on the exposed surfaces of buildings have necessitated the expenditure of thousands of dollars by property owners to maintain a satisfactory exterior appearance on the buildings. The window sills, roofs, and ledges of the buildings in metropolitan areas are frequently used as resting places by such birds as starlings, pigeons, sparrows, and the like. Although mechanical devices such as scarecrows and noisemakers have been used with moderate success for discouraging birds from resting in open fields and the like, these devices are not suitable for use on or near large buildings because of the variety of different resting places which are available for birds. Moreover, it frequently happens that the birds become so accustomed to the mechanical devices that they are no longer effective. While some property owners have used electrically charged wires on the ledges and window sills of buildings to discourage birds from roosting, this solution to the problem is very expensive and requires a great deal of continued maintenance.

According to this invention, these and other disadvantages of the prior art methods of discouraging birds from resting on a particular surface are overcome by applying an effective amount of a phenol compound to the surface. The phenol compounds of this invention also include substituted phenols.

Accordingly, it is an object of this invention to prevent birds from resting on a particular surface. Another object of this invention is to provide a method of rendering a surface repellent to birds. These and other objects of the invention will become apparent to one skilled in the art after studying the following detailed description and the appended claims.

According to the present invention, a surface can be rendered repellent to birds by applying phenol or a substituted phenol compound to the surface in an amount sufficient to discourage birds from resting thereon. The phenol and substituted phenol compounds suitable for use in the practice of this invention are illustrated by the formula

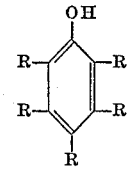

wherein each R can be the same or different and is selected from the group consisting of hydrogen and alkyl, cycloalkyl, and aryl radicals, and combinations thereof such as alkaryl radicals, aralkyl radicals, alkylcycloalkyl radicals, and cycloalkylalkyl, containing from 1 to 8 carbon atoms, inclusive.

Exemplary compounds which can be used in the practice of this invention and which are within the scope of the above formula include:

phenol
2-methylphenol (o-cresol)
3-methylphenol (m-cresol)
4-methylphenol (p-cresol)
2-ethylphenol
3-propylphenol
4-isopropylphenol
2,4-dibutylphenol
2,6-dimethyl-4-hexylphenol
3-methyl-4-(2-ethylhexyl)-5-pentylphenol
4-tert-butylphenol
2,3,4,5,6-pentaoctylphenol
2-cyclopentylphenol
2-methyl-4-cyclohexylphenol
3-cyclooctylphenol
2-(cyclopentylmethyl)phenol
2-ethyl-4-(3-methylcyclohexyl)phenol
2,6-dicyclohexyl-4-methylphenol
2-methyl-3-propyl-4-cyclopentyl-5-ethylphenol
2,6-diphenyl-4-methylphenol
2-benzylphenol
4-p-tolylphenol
2,6-dimethyl-4-m-tolylphenol.

The phenol and substituted phenol compounds of this invention can be obtained commercially or they can be prepared by any of the suitable techniques well known in the art. For example, a saturated hydrocarbyl halide can be reacted with phenol or a substituted phenol in the presence of a Friedel-Crafts catalyst, or an acyl halide can be reacted with phenol or a substituted phenol in the presence of a Friedel-Crafts catalyst, followed by Clemmensen reduction, to produce the desired substituted phenol repellent compounds of the invention.

The phenol and substituted phenol bird repellent compounds of this invention can be applied to a surface for their intended purposes either as the pure compound or in solution in a solvent. Exemplary solvents which can be used for this purpose include acetone, kerosene, naphthas, and isoparaffinic hydrocarbons which boil in the range of about 260° to about 800° F. The compounds can also be applied to a surface in admixture with water in the form of an aqueous emulsion, in which case a suitable emulsifying or wetting agent preferably is employed. In certain situations, it may be desirable to apply the compounds as a dust or powder. The compounds can be dispersed in a solid carrier such as kieselguhr or the like when applied in this manner. A suitable adhesive can be admixed with the liquid or solid carrier for the purpose of increasing the adherency of the compound to the surface to which it is applied. The use of an adhesive is also effective when the compound is applied in its pure form. When the compound is applied to exposed ledges and window sills of buildings which are not easily accessible, it is generally preferred to employ an adhesive because the compound does not have to be applied as often and it is less affected by the action of rain and wind. Exemplary materials which can be used as carriers and which also function as an adhesive are natural and synthetic rubber latices. Polymers of butadiene and isoprene and copolymers of butadiene or isoprene with a vinyl compound such as styrene, a gelatin, or a substituted cellulose such as methylcellulose can be used as a carrier and as an adhesive for the compounds of the invention. Latex has been found to be particularly suitable as a carrier and adhesive when used in the practice of this invention. Polyisobutylene and petrolatum can also be used as an adhesive.

Any suitable technique such as spraying, brushing, dusting, etc., can be used for applying the compound in any one of the previously described forms. It is generally preferred to apply the compounds by spraying because of the uniform coating which results. When the repellent compound is dissolved in a solvent, the mixture will contain about 0.1 to about 60 weight percent of the compound. When the compound is dispersed in a solid carrier, it is present in an amount within the range of about 1 to about 60 weight percent based on the total weight of the mixture. These ranges are for illustration only since it is understood that concentrations above and below these values can be used if desired.

The phenols and substituted phenol compounds of this invention are applied to a surface in an amount which is sufficient to render the surface repellent to birds. It is generally preferred to apply the compound in an amount which will provide a concentration of about 0.01 to about 25 or more grams per square foot of surface area. While larger amounts can be used without departing from the spirit and scope of the invention, for economic reasons it is generally preferred not to exceed about 25 grams per square foot of surface area. A series of runs was made to illustrate the effectiveness of the bird repellent compounds of the invention. The results of these runs are reported in the following examples. It must be understood that these examples are for the purpose of illustration only and must not be considered limiting of the invention.

EXAMPLE I

A cage in the form of a wire-enclosed pen 54 feet long and 18 feet wide was used to test the effectiveness of 2,6-dicyclohexyl-4-methylphenol as a bird repellent. The cage contained between about 30 and about 60 starlings. These starlings had been trapped locally and were confined in the cage for a period of from several months to over a year in order for them to become accustomed to their surroundings. A roosting bar which would accommodate four starlings comfortably was situated in a sheltered area at one end of the cage. Aside from the wire sides and the bottom of the cage, the roosting bar was the only roosting surface available to the starlings. An electrical recorder connected to the roosting bar was designed to transmit a signal representative of the weight of a bird or birds on the roosting bar at any given time. The number of starlings actually resting upon the roosting bar was then determined from these data. In a given run, the 2,6-dicyclohexyl-4-methylphenol was dissolved in acetone to provide a 50 percent concentration by weight. This solution was placed on the surfaces of the roosting bar in an amount sufficient to provide a concentration of about 15 grams of the repellent compound per square foot. The recorder was then placed in operation and the duration of the time which none or one or more of the starlings occupied the roosting bar was recorded. Table I below represents the results which were obtained.

TABLE I

| Run No. | Compound | Duration of run (minutes) | Number of starlings (from none through four) on the roosting bar and the time which this number of starlings spent on the roosting bar (minutes) | | | | |
|---|---|---|---|---|---|---|---|
| | | | 0 | 1 | 2 | 3 | 4 |
| 1 | 2,6-dicyclohexyl-4-methylphenol. | 660 | 660 | 0 | 0 | 0 | 0 |
| 2 | do | 500 | 500 | 0 | 0 | 0 | 0 |
| 3 | do | 550 | 550 | 0 | 0 | 0 | 0 |
| 4 | do | 520 | 520 | 0 | 0 | 0 | 0 |

From these data, it can be seen that the substituted phenol compound 2,6-dicyclohexyl-4-methylphenol was very effective for deterring the birds from resting on the roosting bar since no birds rested on the roosting bar during any of the runs.

While the invention has been described in considerable detail, it must be understood that such detail is for the purpose of illustration only and that many variations and modifications can be made in the invention without departing from the spirit and scope thereof.

We claim:
1. A method of repelling birds from a surface which comprises applying to said surface a bird repelling amount of 2,6-dicyclohexyl-4-methyl-phenol.
2. A method according to claim 1 wherein said compound is applied by means of a liquid carrier selected from the group consisting of water, acetone, kerosene, naphthas, and isoparaffinic hydrocarbons which boil in the range of about 260 to about 800° F.
3. A method according to claim 1 wherein said compound is applied in admixture with an adhesive selected from the group consisting of latex, gelatin, methylcellulose, polyisobutylene, and petrolatum.
4. A method according to claim 1 wherein said compound is dispersed in kieselguhr prior to being applied to said surface.
5. A method according to claim 1 wherein said compound is applied in an amount to provide about 0.01 to about 25 grams of compound per square foot surface area.

References Cited

UNITED STATES PATENTS 2,192,347  3/1940  Yeadon _____ 424—346
2,258,552  10/1941 Schirm _____ 424—346

ALBERT T. MEYERS, Primary Examiner

S. J. FRIEDMAN, Assistant Examiner